United States Patent [19]

Eiermann et al.

[11] 3,918,413
[45] Nov. 11, 1975

[54] COMPOUND ROTARY PISTON ENGINE

[75] Inventors: Dankwart Eiermann; Felix Wankel, both of Lindau, Germany

[73] Assignee: Wankel GmbH, Lindau, Germany

[22] Filed: June 27, 1973

[21] Appl. No.: 374,046

[30] Foreign Application Priority Data
July 5, 1972  Germany............................ 2233014

[52] U.S. Cl. ................. 123/8.07; 123/8.15; 60/901
[51] Int. Cl.² ......................................... F02B 53/08
[58] Field of Search..... 123/8.41, 8.05, 8.07, 119 C, 123/119 CF, 113, 119, 115, 122, 8.15, 120, 121; 60/901, 304

[56] References Cited
UNITED STATES PATENTS

| | | | |
|---|---|---|---|
| 2,622,390 | 12/1952 | Newton.................................. | 60/13 |
| 2,993,482 | 7/1961 | Froede............................. | 123/8.15 |
| 3,193,188 | 7/1965 | Bentele............................. | 418/121 |
| 3,259,115 | 7/1966 | Bensinger et al. ................. | 418/113 |
| 3,269,369 | 8/1966 | Ehrhardt............................ | 123/8.01 |
| 3,387,595 | 6/1968 | Bentele............................. | 123/8.09 |
| 3,546,878 | 12/1970 | Yoshimura.......................... | 60/304 |
| 3,688,749 | 9/1972 | Wankel............................. | 123/8.41 |

*Primary Examiner*—C. J. Husar
*Assistant Examiner*—O. T. Sessions
*Attorney, Agent, or Firm*—Walter Becker

[57] ABSTRACT

A compound supercharged rotary piston engine device in which a rotary piston compressor is interposed between a pair of rotary piston engines to form a unit. A single shaft extends through the unit and has coaxial eccentrics for the engines and an eccentric displaced 180° therefrom for the compressor. The compressor supplies primary combustion air to the engines and also supplies air thereto for afterburning uncombusted fuel entrained in the exhaust gases of the engines. The air supply from the compressor to the engines takes place in a set of passages in the walls which separate the compressor from the engines and the passages are under the control of the pistons of the device.

11 Claims, 5 Drawing Figures

COMPOUND ROTARY PISTON ENGINE

The present invention relates to a superchargeable rotary piston internal combustion engine with stationary housing for the internal combustion engine which housing consists of a mantle with a triangular arched inner surface and side and intermediate parts which confine an inner chamber through which perpendicularly extends an eccentric shaft. Rotatably journalled on the eccentric of the eccentric shaft is a four-cornered piston the speed of which by means of a transmission comprising a hollow wheel connected to the piston and a pinion stationarily connected to the housing has a ratio of 3:4 to the speed of the crank shaft. The internal combustion engine housing furthermore comprises a connecting passage which establishes communication between a working chamber which is located at the end of the expansion stroke and the working chamber which is running ahead of the first mentioned working chamber. The shaft of this rotary piston internal combustion engine has also mounted thereon a second internal combustion engine which means the shaft is common to both the first mentioned and the second internal combustion engine. Between these two internal combustion engines there is mounted on the common shaft a supercharger which operates as a circular piston engine. The engine construction according to the present invention furthermore comprises passage means for conveying fresh air from the supercharger into the combustion engines which passage means lead into those axis near zones which are located shortly ahead of or above the upper dead center ignition point.

With engine combinations of this type it is also possible with circular piston engines of the above described construction to practice a working method without applied or additional ignition. Furthermore, in this way a complete combustion of the fuel can be obtained so that the content in poisonous gases will be considerably reduced.

The combination of an internal combustion engine of the above described type with a transmission ratio of 3:4 with a supercharger is known which supercharger represents a trochoidal engine operating on a common eccentric shaft in slip engagement at a transmission ratio of 1:2. From this unit comprising a supercharger and an internal combustion engine, however, no meaningful multi-disc engines can be produced because that end of the shaft which for this purpose would have to be passed through the narrow piston of the supercharger would be too weak, whereas the other shaft end represents the output side. Also the transfer of fresh air from the compression side of the supercharging machine having a transmission ratio of 1:2 to the inlet opening in the side wall of the internal combustion engine would be too difficult in view of the axis near zone following the upper dead center ignition point and in view of the fact that a transfer passage would have to extend either radially transverse through the intermediate part of the housing or would have to be located outside and around the housing so that considerable structural elements and costs as well as losses in flow would have to be put up with. As supercharger for compound circular piston engines of the type of the trochoidal engines working with slip engagement there was suggested an engine with a transmission ratio of 2:3 which supercharges an internal combustion engine of the same construction and the same transmission ratio of 2:3 but with correspondingly smaller dimensions. In this connection, however, only one side of the supercharging engine acts as compressor — the supercharging engine having two inlet and two outlet openings — whereas the other sides operates as expansion engine charged by the exhaust gases of the internal combustion engine for driving the supercharger. Also in this instance difficulties are encountered in connection with compound engines which are composed of a plurality of internal combustion engines. These difficulties are due to the fact that each internal combustion engine must have associated therewith an exhaust gas charging engine, and the arrangement of the two engines on the same shaft necessitates the provision of very unfavorable transfer passages. Also when arranging both engines in the same radial plane one above the other, this drawback cannot be completely avoided while on the other hand an unfavorable structural shape of the engine will result. Furthermore, the employed exhaust gas charging engine requires additional cooling. Engines of the above mentioned trochoidal construction with a transmission ratio of 2:3 which work on both sides as compressors are known, but these engines have heretofore not been employed as superchargers in compound engines.

It is, therefore, an object of the present invention to provide a compound engine which comprises on one and the same shaft supercharging and internal combustion engines which may include a plurality of internal combustion engine units.

It is a particular object of this invention to provide a compound engine as mentioned in the preceding paragraph which has a compact construction and small dimensions and in which the transfer passages for the charge and additional fresh air will have a minimum dead center space and flow losses and the exhaust gases of which will contain only small quantities of poisonous gases.

These and other objects and advantages of the invention will appear more clearly from the following specification in connection with the accompanying drawings, in which.

Figure 1:
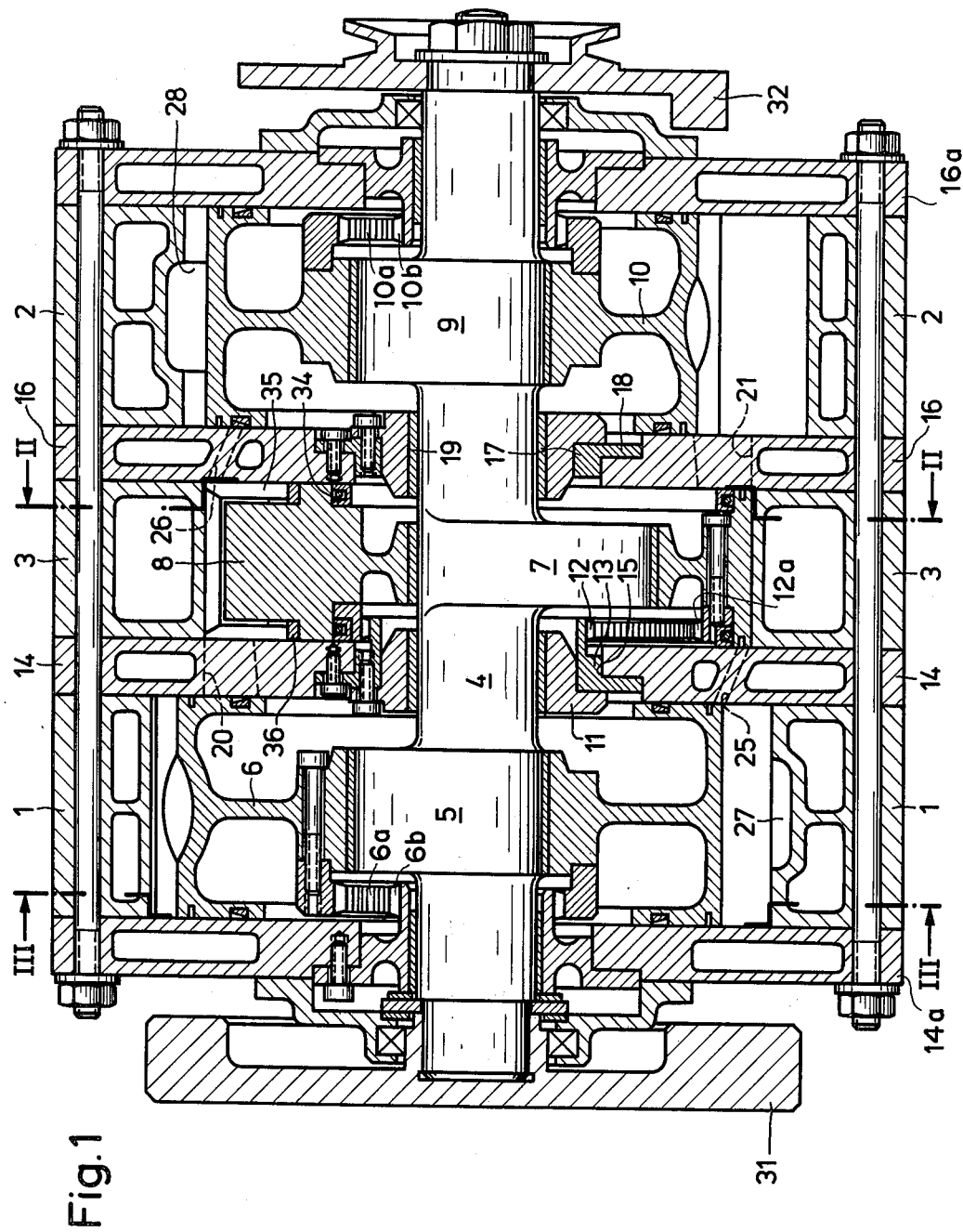
FIG. 1 illustrates an axial section through an engine combination according to the invention which is composed of two internal combustion engines and a compressor.
Figure 2:
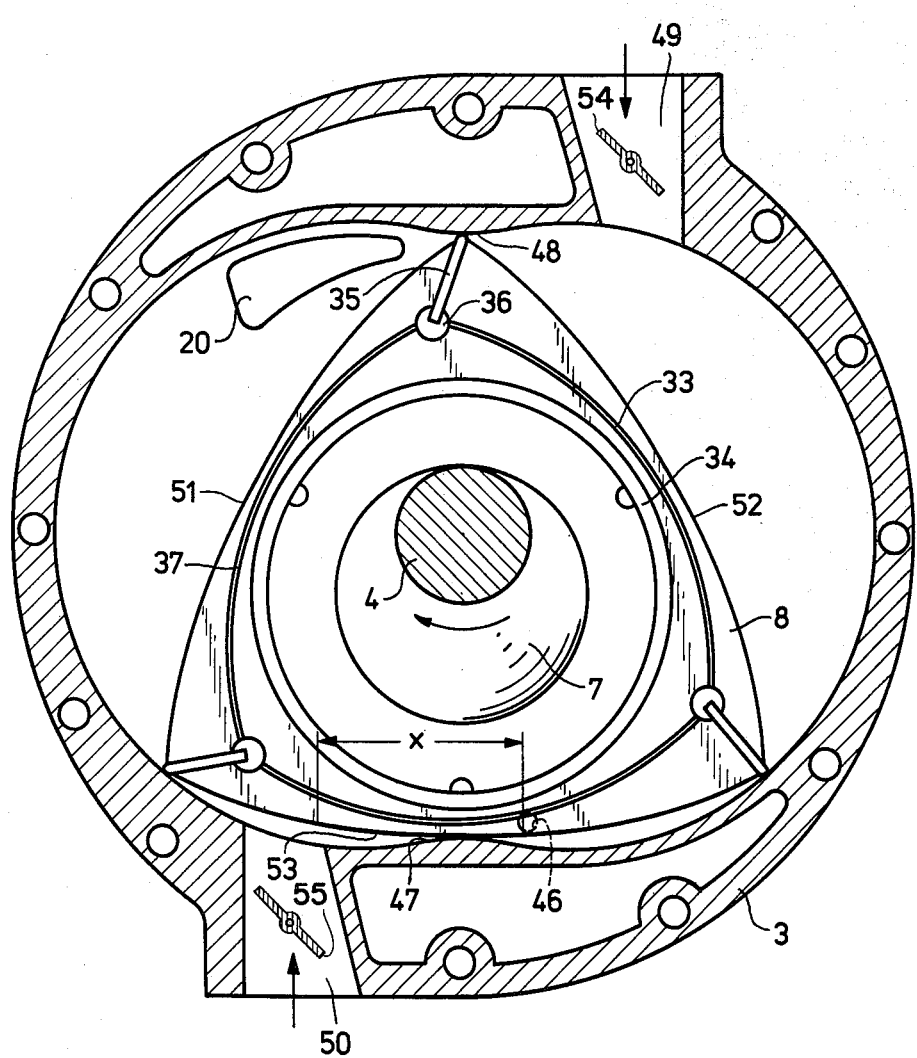
FIG. 2 is a section through the engine combination of FIG. 1, said section being taken along the line II — II of FIG. 1.
Figure 3:
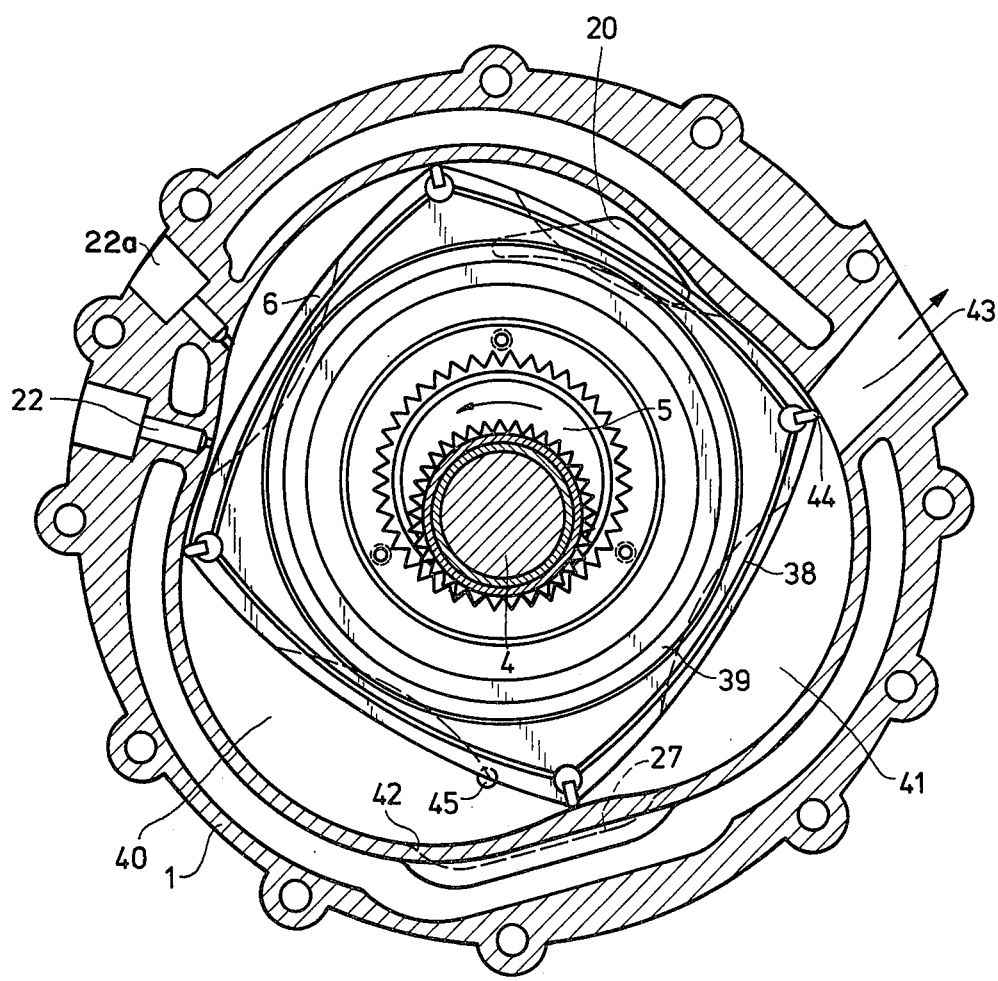
FIG. 3 represents a section taken along the line III — III of FIG. 1.

The rotary piston internal combustion engine according to the present invention is characterized primarily in that it comprises two internal combustion engines which have their eccentrics in the same position and have their housings offset relative to each other by 180° while the two engines operate on the same shaft at a transmission ratio of 3:4. The compound engine according to the invention is furthermore characterized in that between the two engines and on the common shaft thereof there is mounted a trochoidal engine having a transmission ratio of 2:3 and operating in slip engagement. This trochoidal engine operates with an eccentric which is offset by 180° to the eccentrics of the internal combustion engines and operates as compressor. The axis of symmetry of the compressor is turned by from 70° to 85°, preferably 75°, relative to the central axis of the internal combustion engines which central axis extends through the upper dead center ignition point. In the left-hand side part there is provided a transfer slot, and precisely axially opposite thereto in the right-hand side part there is provided a passage of a smaller cross section for transferring the drawn-in and compressed charge from one side of the compressor to the suction chamber of the left-hand internal combustion engine, whereas a smaller portion of this charge is transferred into the expansion chamber and into that chamber of the right-hand internal combustion engine which runs ahead of the expansion chamber. The compound engine according to the present invention also comprises a transfer slot located in the right-hand side part, and furthermore comprises a passage of smaller cross section which is located opposite thereto in the left-hand side part. The last mentioned passage of smaller cross section is intended for a symmetrical corresponding transfer of the charge of the other side of the supercharger into the internal combustion engines.

The invention is furthermore characterized in that the connecting passage is so arranged in the second axis near zone which follows the transfer slot in the direction of rotation of the piston that that end of the connecting passage which, when considering the axis of rotation, forms the front end, is passed over by a corner of the piston when that piston corner which runs ahead of the first mentioned corner relieves the outlet. The invention is still further characterized in that the inlet control opening into the internal combustion engine of the passage for transferring fresh air is so arranged that it will be freed in the piston of the internal combustion engine when one of its corners slides over the connecting passage.

This arrangement of the engine results in a simple and compact construction. The transfer of the charge and of the secondary air for the post-combustion may be effected in the passages which extend almost perpendicularly through the side parts without encountering a flow resistance and while forming a minimum of dead center corners. Above all, the arrangement of the engine according to the invention makes it possible to blow the secondary air at a considerable overpressure into the gas current which passes between the expansion chamber and that chamber of the internal combustion engine which runs ahead of the expansion chamber so that a very satisfactory intermixing with the not yet completely burned gases will occur. The inlet opening of the transfer passage may be blown free by this overpressure at any time when coked deposits and oil accumulations are present which might easily clog up such small opening in the side wall. The chemical energy obtained in view of the post-combustion and post-expansion in the last chamber of the internal combustion engine may be utilized substantially as torque so that the other side of the other side of the supercharger, in contrast to the heretofore known art, does not have to be used as exhaust gas expansion engine for driving the supercharger, but will be available for charging the other combustion engine as compressor. As a result thereof, the axial length of the engine of the present combination will be reduced by the width of one engine unit. A considerable radial increase in the width of the structure by the employment of internal combustion engines with a transmission ratio of 3:4 is thus not necessary.

The diameter of the bores in the intermediate parts for receiving the bearing means for the shafts may be greater than the diameter of the eccentric of the compressor. The diameter of the bore of the bearing means or of the synchronizing gear wheel of the compressor in the bearing supporting part may be greater than the diameter of the eccentrics of the internal combustion engines. In this way it will be possible with divided shaft bearings to pass the eccentric shaft with the eccentrics through the mentioned bore and to mount the eccentric shaft in the housing of the engine. Such a construction results in a very stabile shaft which has to be balanced by counter weights at its ends only, whereas the eccentrics of the internal combustion engines and of the compressor, which eccentrics are offset relative to each other by 180°, will substantially balance each other.

In order to prevent that, when the respective piston portions slide or pass over the transfer slots, the pressure generated in the compressor cannot enter the intermediate compression chamber, the lateral triangles of the radial seals of the compressor must extend so far radially inwardly, and the sealing strips as well as the sealing bolts must be offset inwardly to such an extent and the radial seal and its lateral triangles must be arranged in a dragging manner at an incline in the direction of rotation that the sealing strips and sealing bolts cannot slide over the transfer slots.

Figure 4:
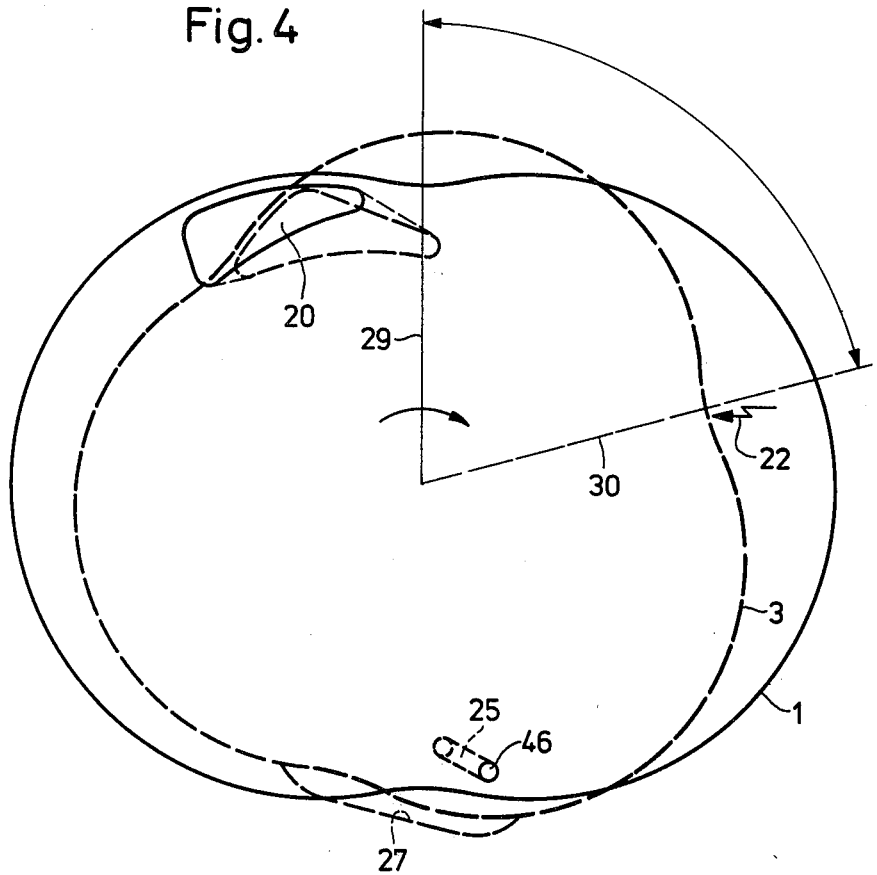
FIG. 4 is a diagrammatic illustration of the trochoids and of the transfer slots as well as of the outlet and inlet control openings for the transfer of fresh air of the compressor and of the internal combustion engines and shows these elements as they are located relative to each other.
Figure 5:
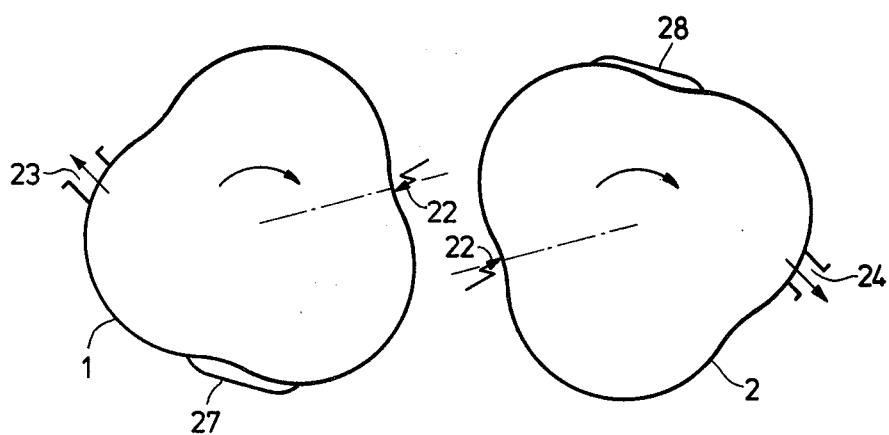
FIG. 5 is a diagrammatic illustration of the trochoids of the two internal combustion engines and their location relative to each other.

Referring now to the drawings and FIG. 1 thereof in particular, with the engine shown in FIG. 1 there is between the two trochoidal engines 1 and 2, forming internal combustion engines and operating with slip engagement while having a transmission ratio of 3:4, provided a trochoidal engine of the same type which operates as compressor and has a transmission ratio of 2:3. The compressor and the two internal combustion engines are arranged on a common eccentric shaft 4. The four-cornered piston rotates on the eccentric 5, whereas the three-cornered piston 8 rotates on the eccentric 7. The four-cornered piston 10 rotates on the eccentric 9. Between the compressor 3 and the left combustion machine 1 there is a housing intermediate wall 14 and upon the outer side of the combustion machine 1 there is provided a housing outer wall 14a. Between the compressor 3 and the right combustion machine 2 there is a housing intermediate wall 16 and upon the outer side of the combustion machine 2 there is arranged a housing outer wall 16a. Upon the eccentric 5 there is a square piston 6 rotating or running therearound which becomes synchronized by a drive consisting of an inner toothed wheel 6a and a gear or pinion 6b. Upon the eccentric 7 there is a triangular piston 8 rotating or running therearound which becomes synchronized by a drive consisting of a gear or pinion 12 and the inner toothed wheel 12a. In a corresponding manner, there is a synchronizing drive arranged upon the square piston 10 rotating or running around the eccentric 9; the synchronizing drive consists of an inner toothed wheel 10 *a* and a gear or pinion 10*b*. The divided bearing 11 of shaft 4 is centered in the non-divided bearing part 13 of the compressor 3, the bearing part 13 being designed as synchronizing gear 12. The bearing part 13 is connected in the intermediate part or wall 14 between the internal combustion engine 1 and compressor 3. The inner diameter of the gear 12 is greater than the diameter of the eccentrics 5 and 9 of the internal combustion engines 1 and 2 respectively. The bore 15 provided in the intermediate part 14 and carrying the bearing part 13 is, however, greater than the diameter of the eccentric 7 of the compressor 3. The bearing part 18 connected to the other intermediate part 16 in bore 17 is not divided and receives the divided shaft bearing 19. The diameter of bore 17 is greater than the diameter of the eccentric 7 of the compressor, whereas the diameter of the bore of the bearing supporting part 18 is greater than the diameter of the eccentrics 5 and 9 of the internal combustion engines. In view of this arrangement, it is possible to slip through and mount the non-divided eccentric shaft 4. The eccentrics 5 and 9 of the internal combustion engines 1 and 2 respectively have the same angular position, whereas the housings of both engines are offset relative to each other by 180° as evident from FIG. 5. The transfer slots 20 and 21 for the compressed fresh charge, the spark plugs and the injection nozzles 22 and the outlet openings 23 and 24 as well as the passages 25 and 26 for transferring fresh air and also the connecting passages 27 and 28 in the second axis near zone are therefore located axially opposite to each other. The axis of symmetry 29 through the axis near zones of the compressor 3 is offset relative to the central axis 30 passing through the ignition upper dead center point of the engines 1 and 2 by an angle of from 70° to 85°, preferably 75°, as shown in FIG. 4. The eccentric 7 of the compressor 3 is offset relative to the eccentrics 5 and 9 of the internal combustion engines 1 and 2 by 180°. In this way, together with the outer counter weights 31 and 32 of which the counter weight 31 is mounted on a flywheel, a simple mass compensation is obtained.

With this arrangement of the engines 1, 2 and 3 relative to each other, the transfer slot 20 is located in the intermediate part 14 and the transfer slot 21 is located in the intermediate part 16, and these slots are located radially opposite to each other, while the connecting passages which connect the intermediate parts pass through the intermediate parts substantially perpendicularly and without forming flow impediments. In this way very short paths and a minimum of dead corners are created for the transfer of the fresh gases. The lengths of these paths are determined only by the cooling requirements of the intermediate parts 14 and 16. To prevent a back expansion, it is necessary that the transfer slots 20 and 21 are either simultaneously controlled by the piston 7 of the compressor 3 or by the pistons 6 or 10 of the internal combustion engines 1 and 2 respectively or are controlled at an earlier period by the four-cornered pistons.

In order to prevent compressed air from passing into the gap between the sealing strip 33 and the inner seal 34 of the piston 7 of the compressor 3 which would bring about a lifting off of the two seals and tumbling movements of the piston 7, the lateral triangles 35 of the radial seal extend at the piston corners radially inwardly to such an extent, and the sealing bolts 36 and the sealing strips 33 and 37 are offset inwardly to such an extent and the radial seal is set in a dragging manner at an incline to the direction of rotation in such a way that the sealing strips 33 and 37 and the sealing bolts 36 do not pass over the transfer slots 20, 21. With the sealing of the pistons 6 and 10 of the internal combustion engines a corresponding arrangement of the corner seal is possible but is not necessary because in this instance in the space between the gas seal 38 and the inner seal 39 the same or higher pressures than in the transfer slots 20 and 21 are formed by leaking gases.

As described in German Offenlegungsschrift 2,019,177, in the internal combustion engines 1 and 2 in the second axis near zones which in the direction of rotation follow the transfer slots 20 and 21, there are provided recess-shaped connecting passages 27 and 28 which connect the expansion chamber 40 with the running ahead chamber 41. The front end 42 of these connecting passages is so arranged that it slides over a piston corner when the outlet 43 is freed by the running ahead piston corner 44. In this instance at which in both chambers 40 and 41 approximately outer pressure or ambient pressure prevails, fresh air can through a small inlet control opening 45 from the passage 25 and 26 ahead of or above the axis near zone passed through by the connecting passages 27, 28 be transferred from the supercharger or compressor 3 in order to initiate a combustion of the not yet or only partially burned fuel components, above all of the supersaturated gas mixture dragging in the rear chamber corner and to complete the combustion prior to the discharge of the gas through the outlet opening 43. In contrast to the engine described in German Offenlegungsschrift 2,019,177, in the present case the transfer of the fresh air from the compressor can be effected through the shortest distance by means of a passage 25, 26, which passage extends nearly perpendicularly through the intermediate part 14, 16 and starts at the discharge opening 46 in the compressor 3, the discharge opening 46 is located precisely radially opposite to the transfer slot 20, 21 for the fresh charge. The transfer slot 20, 21 and the discharge control opening 48 to the passages 25, 26 are therefore controlled and closed by the piston 8 of the compressor 3 at the same instant. The transfer of fresh air into the chambers 40 and 41 of the internal combustion engines 1 and 2 consequently takes place at a higher pressure than the there prevailing pressure, for instance, at a pressure of from 2.5 to 3 atmospheres above atmospheric pressure, or approximately the ambient pressure, so that the inlet opening 45 which may be filled with soot or accumulated oil can always be blown free and that furthermore the fresh air enters at such a high speed into the gas flow of the internal combustion engines 1 and 2 that a sufficient atomization and intermixture with the gas flow will be effected. In the passages 25, 26 there may be arranged check valves in order to retain the pressure which again increases in the working chambers of the internal combustion engines. The inlet opening 45 is so arranged in that side wall of the intermediate part 14, 16 which is located on the side of the internal combustion engine that it will be freed by the pistons 5 and 9 and will again be closed when one of its corners slides over the connecting passage 27, 28.

In view of the position of the individual engines in the engine combination according to the invention relative to each other, this post-combustion which is extremely important for the usefulness of the engine combination is possible within the internal combustion engine itself in a very simple manner.

In order to realize a highly satisfactory gap sealing between the piston 7 and the axis near zones 47, 48 of the mantle paths of the compressor 3, which is necessary after the piston corners have passed over the axis near zones in order to avoid a short circuit with the inlets 49, 50 at the end pressure, the piston flanks 51, 52, 53 are bent outwardly. Very small gap widths can be maintained between these piston flanks and the axis near zones because in this position only tangential but no radial tooth play of the piston transmission can occur, so that it will be safely prevented that the piston flank and the saddle path hit each other.

In order, in case of greater increases in the load, to have the possibility of supercharging, the compressor may be overdimensioned or oversized and may have its inlet passages 49, 50 provided with throttle valves 54, 55 for adjustment to normal operation.

It is, of course, to be understood that the present invention is, by no means, limited to the specific showing in the drawings but also comprises any modifications within the scope of the appended claims. Thus, the engine combination described above may on the same shaft or in a manner known per se be connected to shafts which are coupled to each other and have mounted thereon another engine combination of the same type which is offset to the first engine combination by 90° so that a compound unit with four internal combustion engines will be obtained.

What is claimed is:

1. In a rotary piston device; a compressor comprising a three cornered piston rotatable in a two lobed chamber, an engine on each axial side of the compressor, each engine comprising a four cornered piston rotatable in a three lobed chamber, interconnected housings for the compressor and the engines in which the respective chambers are formed, end walls on the outer ends of the engine housings and other walls between the engine housings and opposite ends of the compressor housing, a shaft journalled in said walls having coplanar eccentrics for the engine pistons and an eccentric for the compressor piston displaced 180° from the engine piston eccentrics, said engine housings being displaced 180° from one another, 3:4 gearing between the engine pistons and the housings and 2:3 gearing between the compressor piston and the housing, the axis of symmetry of said compressor being displaced about 70° to 85° from the central axis of said engines, diametrally opposed air inlets in the compressor housing, fuel injection means and an exhaust port circumferentially spaced therefrom in each engine housing, a larger passage in each said other wall connecting the compressor chamber with the adjacent engine chamber in the suction region thereof which is behind the exhaust port and ahead of the fuel injection and ignition means, and a smaller passage in each said other wall connecting the compressor chamber with the adjacent engine chamber in a region behind the fuel injection and ignition means and ahead of the exhaust port, each larger passage being diametrally opposed to the smaller passage in the same said other wall and axially opposed to the smaller passage in the other said other wall, each engine housing having peripheral passages near the pertaining said smaller passage operable to connect the leading end of the last combusted space about the respective engine piston with the next preceding space about the respective engine piston at about the time the last mentioned space communicates with said exhaust port, said passages being controlled by said compressor and engine pistons so as to supply a major portion of the air compressed by said compressor to said engines as primary combustion air while applying a minor portion thereof to said engines as after combustion air.

2. A rotary piston device according to claim 1 in which each smaller passage is made effective for transferring after combustion air to each engine at substantially the same time a corner of the respective engine piston uncovers the respective exhaust port.

3. A rotary piston device according to claim 2 in which the said peripheral channel of each engine is uncovered by a respective corner of the engine piston after the next following corner has passed over said fuel injection and ignition means and at substantially the time the next preceding corner commences to uncover said exhaust port.

4. A rotary piston device according to claim 1 in which each engine piston covers the respective larger passage prior to the respective space about the engine communicating with said fuel injection and ignition means.

5. A rotary piston device according to claim 1 which includes a divisible shaft bearings in each end plate and each other wall supporting said shaft, a carrier indivisible for each bearing in at least said other walls, each other wall having an aperture to receive the respective carrier, each aperture being larger in diameter than the engine eccentrics, the bearings and carriers pertaining to said other walls being separable in an axial plane.

6. A rotary piston device according to claim 1 in which said shaft protrudes from said end walls, and counterweights on the protruding ends of said shaft.

7. A rotary piston device according to claim 1 in which said compressor piston has end seals and corner seals, said end seals being disposed radially inwardly from the openings in said end walls, said corner seals including end portions extending inwardly at the ends of said pistons and inclined rearwardly in the radially inward direction.

8. A rotary piston device according to claim 1 in which the angle between the axis of symmetry of the housing of said compressor and the central axis of each engine housing which passes through the upper dead center ignition point thereof is about 75°.

9. A rotary piston device according to claim 1 in which the said passages in said other walls are provided with control openings covered simultaneously by the compressor piston.

10. A rotary piston device according to claim 1 in which said compressor is oversized and throttle valve means controlling said air inlets.

11. A compound supercharged rotary piston engine device comprising; a pair of axially spaced rotary piston engines, a rotary piston compressor interposed between said engines, a common shaft extending axially through said engines and compressor, a dividing wall member between said compressor and each said engine and each forming the side wall of the compressor and the respective engine, said shaft having coaxial eccentrics for said engines and an eccentric displaced 180° therefrom for said compressor, said compressor forming two opposite compressor chambers, operating on each revolution of said two piston engines, to supply air to each of said two piston engines, each of said walls between said compressor and said piston engines having a pair of substantially diametrically opposite passages between the compressor and each of said piston engines, one passage in each wall leading from one compression chamber of said compressor to the combustion chamber of said piston engine and the diametrically opposite passage in said wall leading to an afterburning chamber in said piston engine, the passages in one wall being displaced 180° from the passages in the other wall and said passages to the afterburning chambers being substantially smaller than those to said combustion chambers.

* * * * *